(12) United States Patent
Zeirke et al.

(10) Patent No.: US 8,366,578 B2
(45) Date of Patent: Feb. 5, 2013

(54) APPARATUS AND METHOD FOR LUBRICATING A GEAR

(75) Inventors: John D. Zeirke, Decatur, IL (US); Keith A. Kabrick, Springfield, IL (US); Christopher P. Braet, Peoria, IL (US); Daniel J. Reed, Brimfield, IL (US); Timothy F. Nusz, Wyoming, IL (US); Rick T. Lasko, Homer Glen, IL (US)

(73) Assignee: Caterpillar Inc., Peoria, IL (US)

( * ) Notice: Subject to any disclaimer, the term of this patent is extended or adjusted under 35 U.S.C. 154(b) by 805 days.

(21) Appl. No.: 12/261,150

(22) Filed: Oct. 30, 2008

(65) Prior Publication Data
US 2010/0113204 A1 May 6, 2010

(51) Int. Cl.
*F16H 57/04* (2010.01)
(52) U.S. Cl. ...................................................... 475/160
(58) Field of Classification Search .................. 180/372; 184/11.1, 13.1; 475/160
See application file for complete search history.

(56) References Cited

U.S. PATENT DOCUMENTS

| | | | | |
|---|---|---|---|---|
| 4,296,648 A | * | 10/1981 | Okano et al. ............... | 475/159 |
| 4,380,274 A | * | 4/1983 | Abraham et al. ............ | 180/308 |
| 4,573,373 A | * | 3/1986 | Shimizu et al. .............. | 74/468 |
| 6,039,667 A | * | 3/2000 | Schunck et al. ............. | 475/159 |

* cited by examiner

*Primary Examiner* — David D Le
*Assistant Examiner* — Derek D Knight
(74) *Attorney, Agent, or Firm* — Jonathan V. Trousdale; John P. Wappel

(57) ABSTRACT

A gear train assembly includes a first reduction planetary gear set having a rotating carrier and a second reduction planetary gear set having a non-rotating carrier. A plurality of vanes are attached to the carrier to direct oil from an oil bath towards the non-rotating carrier as the rotating carrier rotates.

12 Claims, 5 Drawing Sheets

APPARATUS AND METHOD FOR LUBRICATING A GEAR

TECHNICAL FIELD

The present disclosure relates generally to a gear train assembly for a machine, and more particularly to a gear train assembly having a double reduction planetary gear set.

BACKGROUND

Various machines, such as mining trucks, are known to employ drive propulsion systems to propel or retard the machine, such as a mechanical drive or an electric drive. An electric drive propulsion system, for example, generally includes an alternator, or other electrical power generator, driven by an internal combustion engine. The alternator, in turn, supplies electrical power to one or more electric drive motors connected to wheels of the machine. The motors are generally connected to the wheels by way of a final drive assembly that reduces the rotational speed of the motor. The final drive of a machine may employ one or more planetary gear sets to reduce the output speed of the propulsion system. Such planetary gear sets may include a planetary gear reduction stage having a non-rotating carrier. Such planetary gear reduction stages may include one ore more planetary gears that are less than fully submerged in an oil bath. There exists a need to lubricate and/or cool such planetary gears.

Some final drive assemblies may provide systems that pump oil to such planetary gears by way of supply lines, such as the lubrication system disclosed in U.S. patent application having Ser. No. 12/152,172, filed May 13, 2008 by Kabrick et al. However, such lubrication systems may add additional expense and complexity to machines, and may require the use of energy to drive the lubrication pumps.

SUMMARY OF THE DISCLOSURE

In one aspect of the disclosure a gear train assembly is describe having a first reduction planetary gear set with a rotating carrier that is rotatable about an axis in a primary direction and is partially submerged in an oil bath, a second reduction planetary gear set with a non-rotating carrier, a second reduction planetary gear rotatably coupled to the non-rotating carrier that is unsubmerged in the oil bath, and a vane coupled to the rotating carrier. According the disclosure, the vane directs oil from the oil bath to the second reduction planetary gear as the rotating carrier rotates in the primary direction.

According to another aspect of the disclosure, a method of lubricating a gear train assembly is described comprising the steps of providing a first reduction planetary gear set having a rotating carrier partially submerged in a first oil bath and rotatable in a primary direction, and a plurality of vanes coupled to the rotating carrier; providing a second reduction planetary gear set including a non-rotating carrier, and a second reduction planetary gear rotatably coupled to the non-rotating carrier; and rotating the rotating carrier in the primary direction. According to the disclosed method the vane directs oil from the first oil bath to the second reduction planetary gear as the rotating carrier rotates.

DETAILED DESCRIPTION

Figure 1:
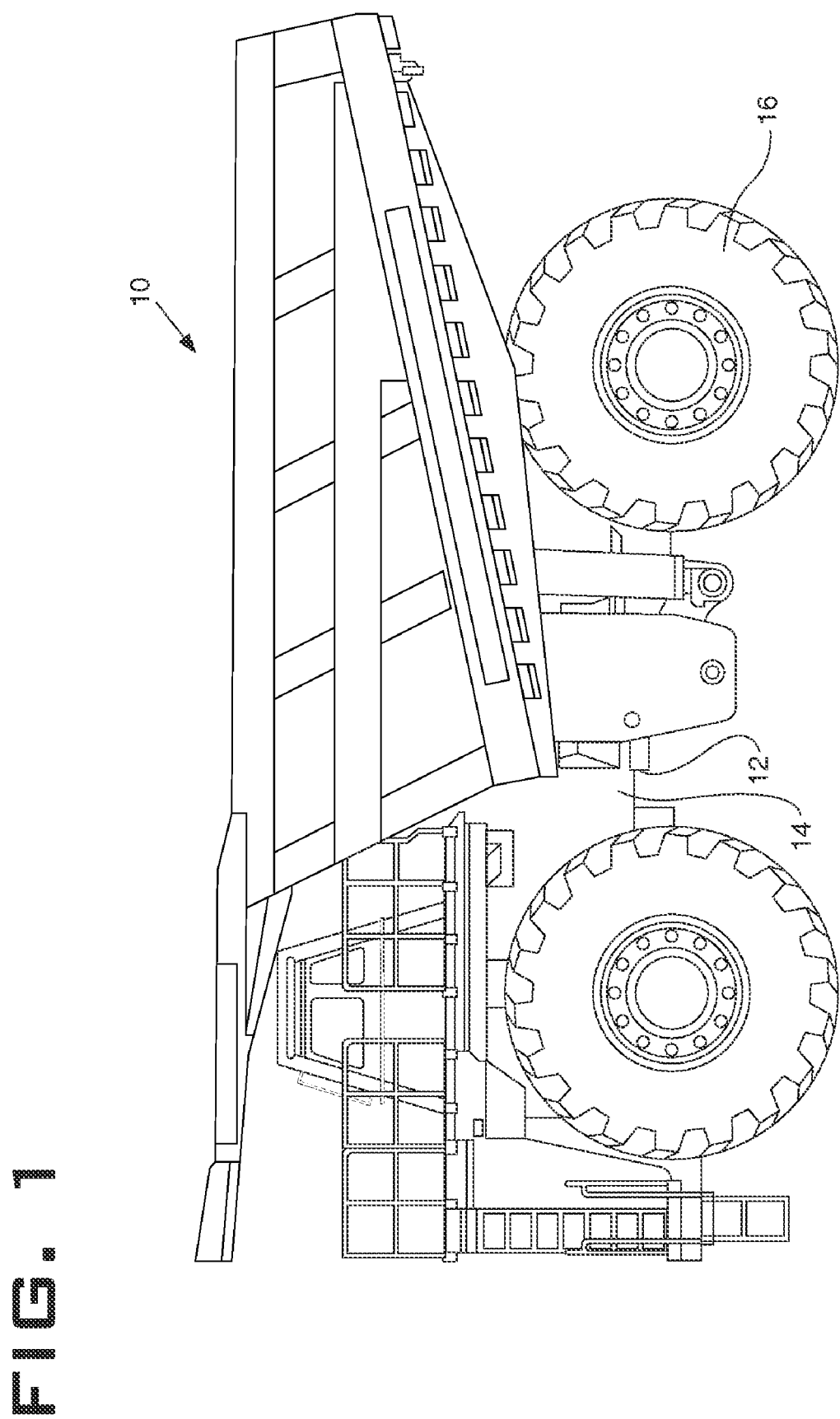
FIG. 1 is a side diagrammatic view of a machine, according to the present disclosure.

An exemplary embodiment of a machine 10 is shown generally in FIG. 1. The machine 10 may be a mining truck, as shown, or any other off-highway or on-highway vehicle. The machine 10 may have a propulsion system such as a mechanical, hydraulic, or electric drive system; in the exemplary embodiment the machine 10 has an electric drive propulsion system. As such, machine 10 may also be referenced herein as an electric drive machine or, more specifically, an electric drive off-highway truck. In the illustrated embodiment, machine 10 generally includes a frame 12 having an electric drive propulsion system 14 supported thereon for driving wheels of the machine 10, such as, for example, rear wheels 16 (only one of which is shown). Electric drive propulsion systems, such as electric drive propulsion system 14, are generally known and, therefore, the entire system will not be described herein in detail.

One skilled in the art, however, should appreciate that an exemplary electric drive propulsion system, such as electric drive propulsion system 14, may include an internal combustion engine, such as, for example, a compression or spark-ignited engine, that provides power to an alternator, or other electrical power generator. The alternator may produce electrical power sufficient to power one or more electric drive motors that, in turn, power rear wheels 16 to propel the machine 10.

Figure 2:
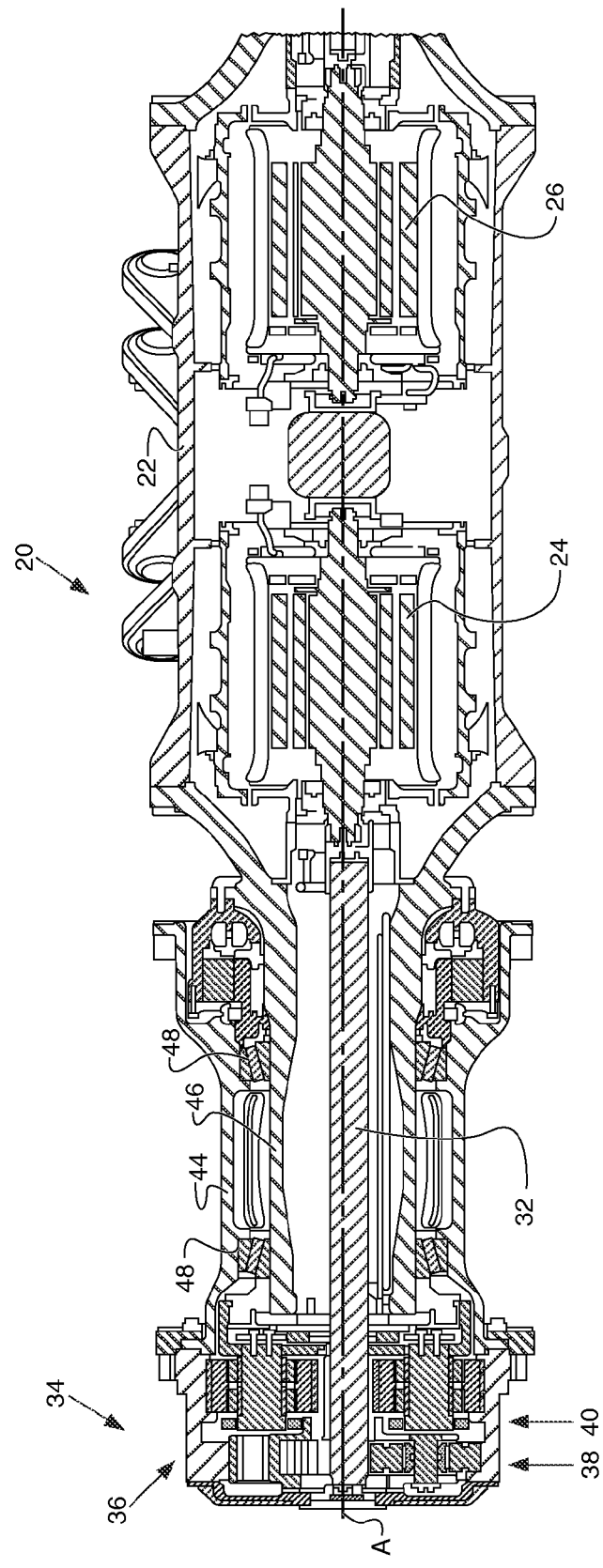
FIG. 2 is a side diagrammatic view, in cross section, of a rear axle assembly of the machine of FIG. 1.
Figure 3:
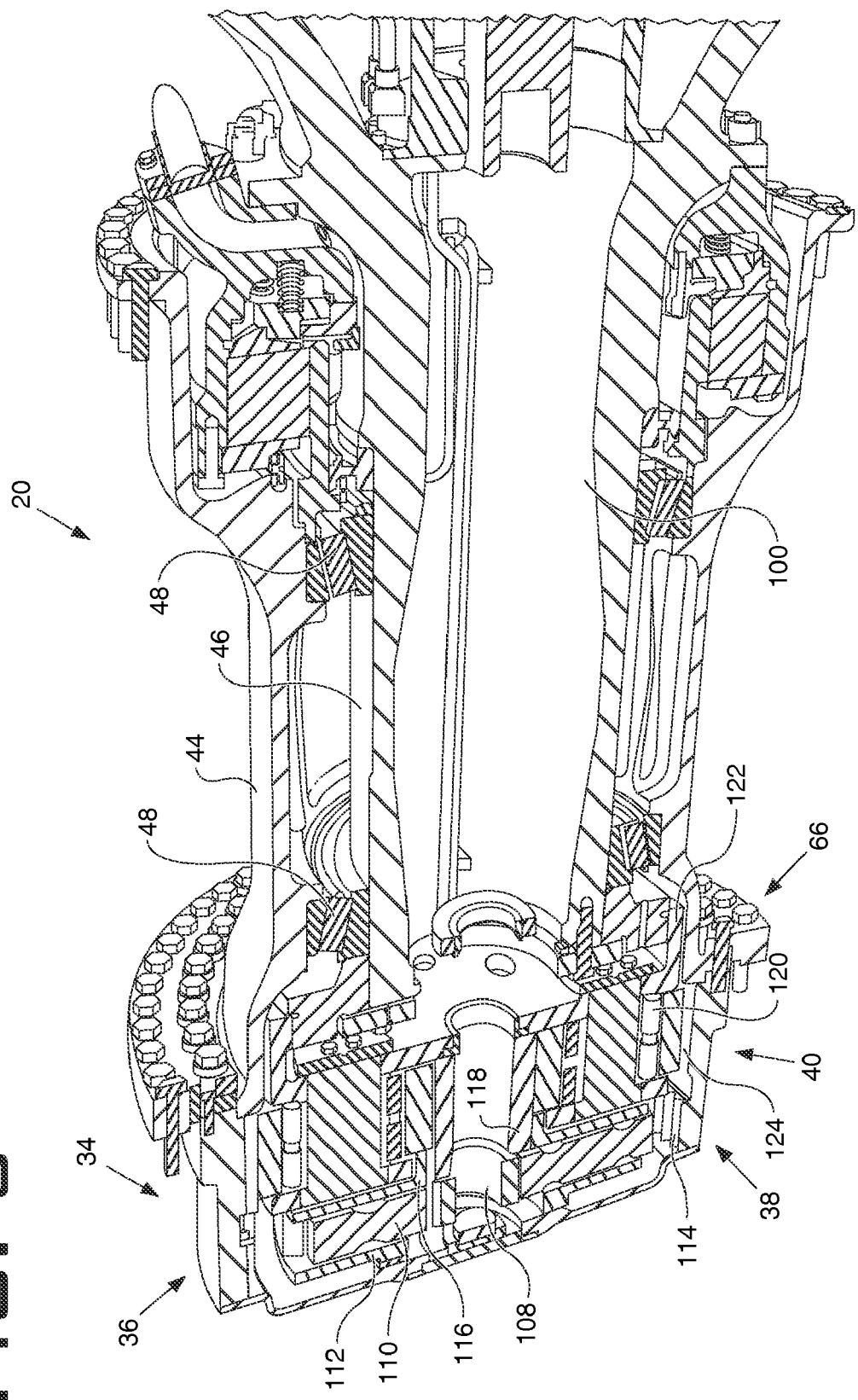
FIG. 3 is a perspective diagrammatic view, in cross section, of the rear axle assembly of FIG. 2.

Turning now to FIGS. 2 and 3, an axle assembly 20, such as a rear axle assembly, may be attached to the frame 12 of machine 10 using any known attachment means, and may support wheels, such as the rear wheels 16 shown in FIG. 1. The axle assembly 20 may include a central axle housing 22 that may include the attachment means (e.g., fasteners) to the machine frame 12. A pair of opposed electric drive motors 24 and 26 of the electric drive propulsion system 14 may be oriented along an axis, such as a substantially horizontal axis A, and may be disposed within the central axle housing 22.

Electric drive motor 24 may be operatively connected to an axle shaft 32. Specifically, the electric drive motor 24 may be configured to drive the axle shaft 32, which, in turn, may be configured to drive a final drive assembly 34. The final drive assembly 34 may, for example, include a double reduction planetary gear set 36, discussed below in greater detail, which includes a first reduction planetary gear set 38 and a second reduction planetary gear set 40. As shown in the illustrated embodiment, the first reduction planetary gear set 38 may be positioned outward of the second reduction planetary gear set 40 and may be directly driven by the axle shaft 32. The first reduction planetary gear set 38 may, in turn, drive the second reduction planetary gear set 40.

The final drive assembly 34 or, more specifically, the second reduction planetary gear set 40, may be configured to rotate a wheel assembly 44. The wheel assembly 44 may be positioned between the central axle housing 22 and the final drive assembly 34, and may be configured to support wheels, such as the rear wheels 16 of FIG. 1. It should be appreciated that wheel assembly 44 may be configured to support one wheel or, alternatively, a pair of wheels, as is known in the art. The wheel assembly 44 may be rotatably supported on a spindle assembly 46 extending from the central axle housing 22. According to one embodiment, the wheel assembly 44 may be rotatably mounted on the spindle assembly 46 using known wheel or roller bearings 48.

Figure 4:
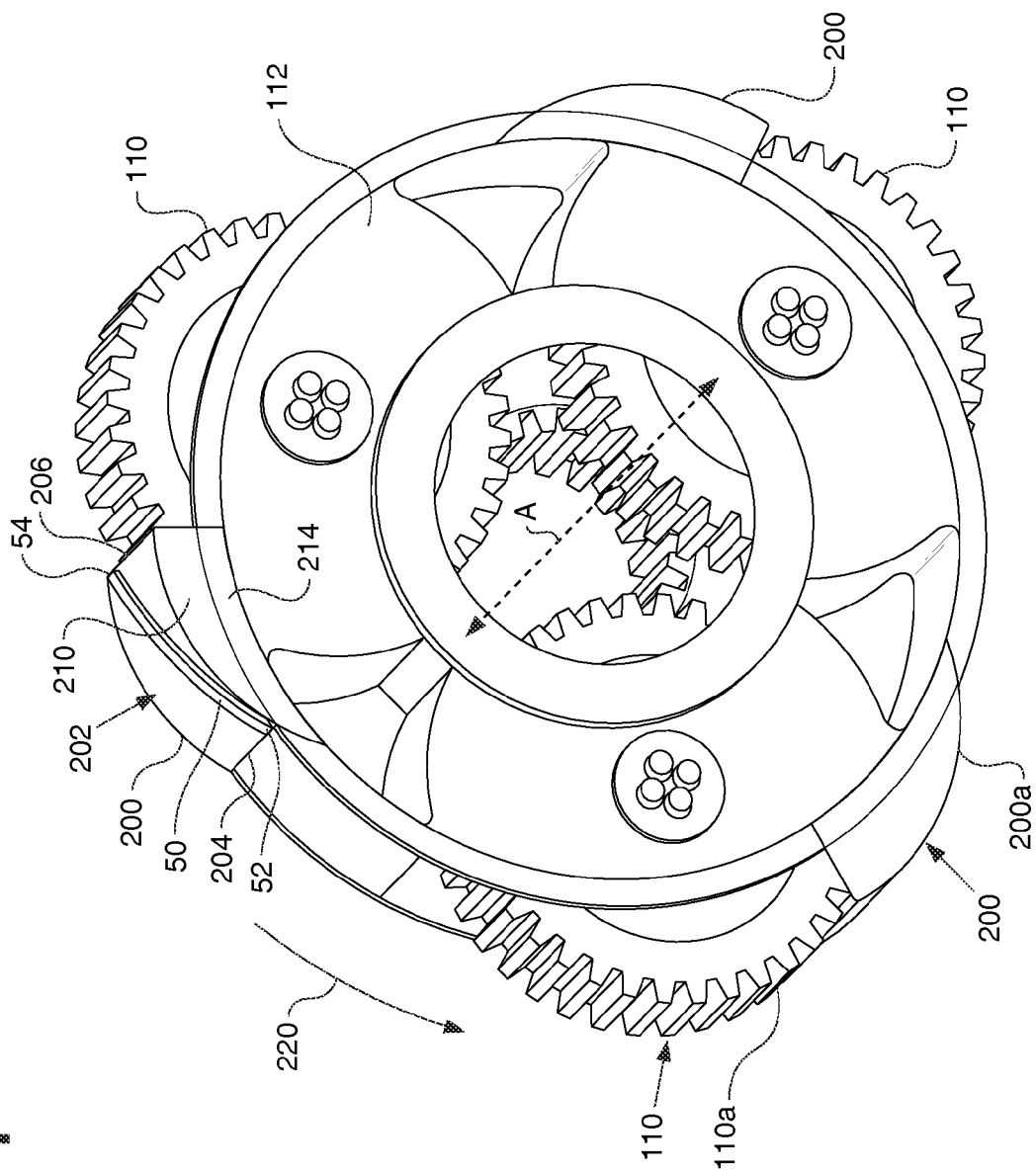
FIG. 4 is a perspective diagrammatic view of a first stage reduction planetary gear assembly of the rear axle assembly of FIG. 2.

According to a specific example, the first reduction planetary gear set 38 may include a sun gear 108 that may be driven by the axle shaft 32 (shown removed in FIG. 3). As the sun gear 108 rotates, it may drivingly engage a set of planetary gears 110, supported by a rotating carrier 112, and in meshed engagement with a ring gear 114. The rotating carrier 112 may be rotatable about axis A, as illustrated in FIGS. 2 and 4, and the ring gear 114 may be attached to the wheel assembly 44, as shown.

As the planetary gears 110 and the rotating carrier 112 rotate, a splined engagement feature 116 extending from the rotating carrier 112 may drivingly engage a sun gear 118 of the second reduction planetary gear set 40. The sun gear 118 of the second reduction planetary gear set 40, in turn, may drive a set of planetary gears 120, supported by a non-rotating carrier 122. As shown, the non-rotating carrier 122 may be attached to the spindle assembly 46 and, as such, may remain relatively stationary. It should be appreciated, therefore, that driving engagement of the planetary gears 120, supported within non-rotating carrier 122, may drive a ring gear 124 of the second reduction planetary gear set 40 and, as a result, rotate the wheel assembly 44 attached thereto.

It should be appreciated that the axle assembly 20 may include an internal axle cavity 100, or lubrication chamber, defined by the spindle assembly 46 and the final drive assembly 34, as shown in FIG. 3. The internal axle cavity 100 may contain a supply of lubricant, such as a sump or oil bath, for lubricating components of the axle assembly 20, such as gears and bearings, and dissipating heat therefrom. According to one example, the first reduction planetary gear set 38 and the second reduction planetary gear set 40 may be partially submerged in an oil bath. In a specific example, roughly one-third of the heights of the respective carriers 112, 122 are submerged in oil when the machine 10 is stationary.

It should also be appreciated that, because of the stationary nature of the non-rotating carrier 122 of the second reduction planetary gear set 40, one or more of the planetary gears 120 may not receive adequate lubrication from the oil bath. To elaborate on this point, one or more of the planetary gears 120 of the second reduction planetary gear set 40 may be unsubmerged, which, as used herein, means less than fully submerged in the oil bath. In some instances the unsubmerged planetary gear 120 may be fully suspended above the oil bath, such that when the machine 10 is stationary, the unsubmerged planetary gear 120 is not in direct contact with the oil bath. Alternatively, a portion of the unsubmerged planetary gear 120 may be in contact with the oil bath, while another portion of the unsubmerged planetary gear 120 is above the oil bath.

With regard to the oil bath, the double reduction planetary gear set 36 may be configured such that the portion of the oil bath in contact with the first reduction planetary gear set 38 (referred to herein as the first reduction oil bath) is substantially partitioned from the portion of the oil bath in contact with the second reduction planetary gear set 40 (referred to herein as the second reduction oil bath). The first reduction oil bath may be partitioned from the second reduction oil bath, for example, by a component designed to provide such a partition, by the rotating carrier 112, by other components of the final drive assembly 34, or by any combination thereof. The first reduction oil bath and the second reduction oil bath may be in fluid communication, but fluid flow between the two baths may be restricted.

In order to supply oil to the unsubmerged planetary gear 120, a vane 50 may be attached to the rotating carrier 112, as illustrated in FIG. 4. The vane 50 may be constructed from various materials, such as, for example, a bent square bar.

The illustrated rotating carrier 112 has a primary direction of rotation 220, as illustrated in FIG. 4, which refers to the direction that the rotating carrier 112 rotates when the machine 10 moves forward. The vane 50 may be oriented such that as the rotating carrier 112 rotates in the primary direction of rotation 220, the vane 50 directs oil from the oil bath towards the unsubmerged planetary gear 120. For example, the vane 50 may be oriented oblique to the carrier's axis A, such that the leading edge 52 of the vane 50 is disposed away from the second reduction planetary gear set 40 and the trailing edge 54 of the vane 50 is disposed towards the second reduction planetary gear set 40. In this manner, as the rotating carrier 112 rotates in the primary direction 220, oil is directed from the oil bath towards the second reduction planetary gear set 40, and more particularly toward the unsubmerged planetary gear 120.

Figure 5:
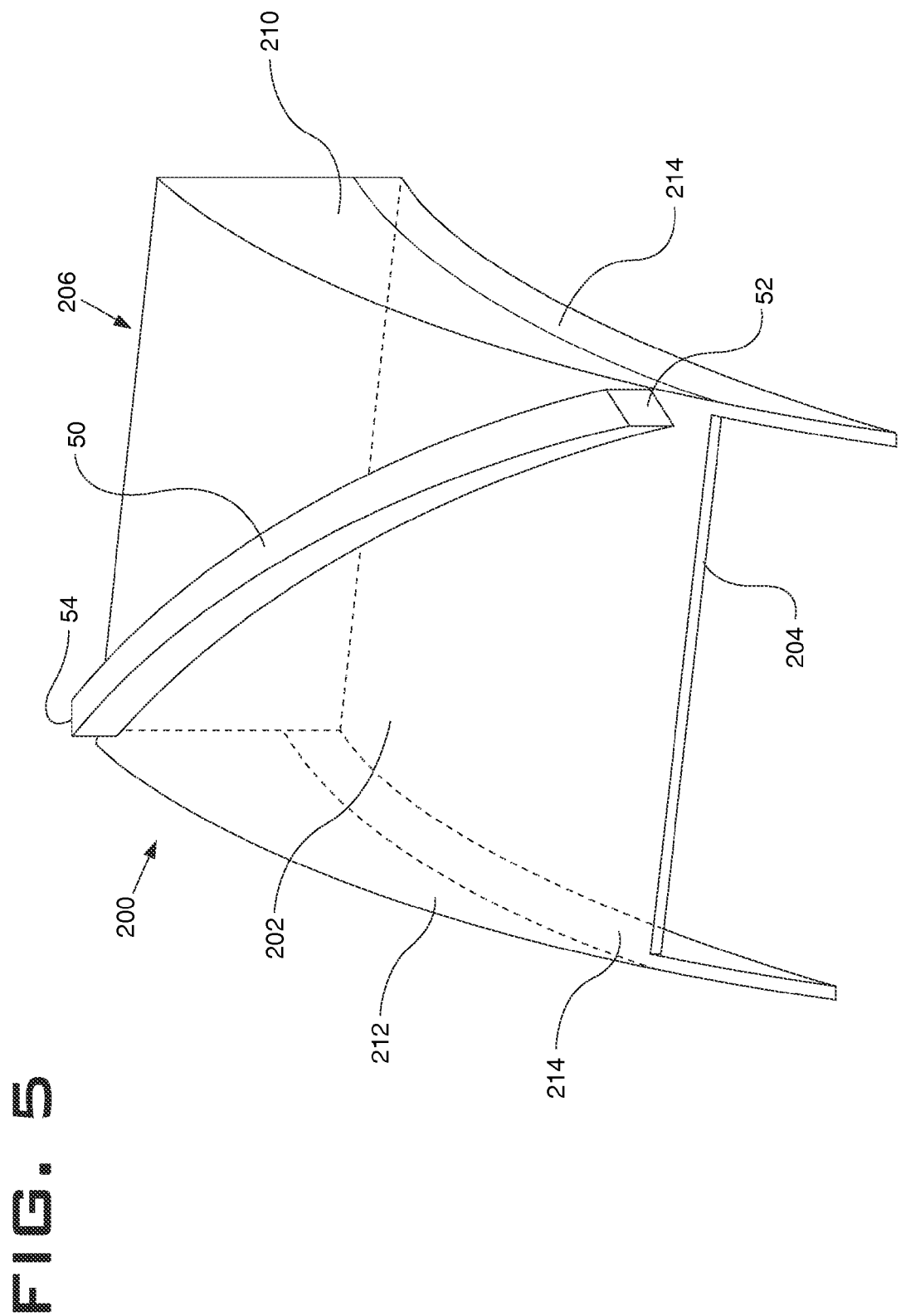
FIG. 5 is a perspective diagrammatic view of a sheath, according to the present disclosure.

As further illustrated in FIGS. 4 and 5, each vane 50 may be attached to the rotating carrier 112 by way of a sheath 200 partially covering each of the planetary gears 110 in the first reduction planetary gear set 38. Each sheath 200 may cover a portion of a respective planetary gear 110, for example, sheath 200a has a respective planetary gear 110a. As illustrated, each of the sheaths 200 are coupled to the rotating carrier 112 and have an outer surface 202 with a first end 204 proximal to the rotating carrier 112 and distal to the planetary gear 110, and a second end 206 proximal to the planetary gear 110 and distal to the rotating carrier 112. According to the exemplary embodiment, the vanes 50 are attached to the outer surfaces 202 of the sheaths 200. The vanes 50 may be integrally formed with the sheaths 200 or attached to the sheaths 200 by any means known in the art, such as, for example, welding. According to another embodiment, the first ends 204 of the outer surfaces 204 are substantially flush with the rotating carrier 112. Furthermore, an inner surface of the sheaths 200 may form an envelope that partially encloses a portion their respective planetary gears 110.

As seen most clearly in FIG. 5, each sheath 200 may be constructed of a first member forming a first sidewall 210, a second member forming a second sidewall 212 and a third member defining the outer surface 202; the first, second and third members may be joined together by any means known in the art, such as, for example, by welding. The first sidewall 210 and the second sidewall 212 may be substantially perpendicular to the rotating carrier's axis A and may support the third member. The first sidewall 210 and the second sidewall 212 may also include a mounting portion 214 to facilitate mounting the sheath 200 to the rotating carrier 112, such as by way of bolts, welds, or any other attachment means known in the art. As illustrated in FIG. 5, the third member may be constructed of a curved plate, such that the outer surface 202 is curved, which is to say a cross section of the outer surface 202, taken along a plane perpendicular to the carrier's axis of rotation A, may substantially form an arc.

Alternatively, each sheath 200 may be constructed differently than described above, such as, for example, by forming a single piece of metal into the general shape of the sheaths 200 illustrated in FIGS. 4 and 5. Such sheaths 200 may have some differences in shape; for example, a cross section of such a sheath 200, taken along a plane that contains the carrier's axis of rotation A, may form a substantially continuous arc. According to yet another embodiment the sheaths 200 may also be integrally formed with the carrier 112, such as by casting the sheath 200 into the circumference of the carrier 112.

Each sheath 200 may be provided with a hydrodynamic profile, which is to say a profile that reduces turbulence generated in the oil bath as each sheath 200 and respective planetary gear 110 enters the oil bath, such as, for example, the profile of the sheaths 200 described above and illustrated in FIGS. 4 and 5.

INDUSTRIAL APPLICABILITY

In operation, an electric drive machine, such as, for example, the machine 10 disclosed herein, will provide electric power to one or more electric drive motors 24, 26, which will, in turn, rotate an axle shaft 32. The axle shaft 32 may then, in turn, rotate the sun gear 108 of the first reduction planetary gear set 38, ultimately causing the rotating carrier 112 to rotate. Under normal operating conditions, the rotating carrier 112 may rotate at speeds up to or exceeding five hundred rotations per minute.

It should be understood that during operation of the machine 10, the machine 10 may be commanded to move forward and the rotating carrier 112 will rotate in the primary direction of rotation 220. As this occurs a given planetary gear 110 may cyclically enter and exit the oil bath. As the planetary gear 110 exits the oil bath, a vane 50 leads the planetary gear 110 out of the oil bath. Due to its orientation, the vane 50 directs oil from the oil bath towards the second reduction planetary gear set 40, and more specifically towards at least one unsubmerged planetary gear 120. In this manner, additional oil is provided to lubricate and/or cool the one or more unsubmerged planetary gears 120.

Furthermore, due to the high rotational speeds of the rotating carrier 112, it may increase the efficiency of the final drive assembly to reduce the level of oil in the first reduction oil bath as the rotational speed of the rotating carrier 112 increases. This may be accomplished by the disclosed vane 50. As the rotational speed of the rotating carrier 112 increases, more oil per second will be directed from the oil bath towards the second reduction planetary gear set 40; much or all of which will then be collected in the second reduction oil bath. Thus, if fluid flow is sufficiently restricted between the first reduction oil bath and the second reduction oil bath, the amount of oil collected in the second reduction oil bath may increase and the amount of oil collected in the first reduction oil bath may decrease as the rotational speed of the rotating carrier increase 112.

It will be apparent to those skilled in the art that various modifications and variations can be made to the disclosed final drive assembly 34 without departing from the scope or spirit of the disclosure. Additionally, other embodiments of the disclosed final drive assembly 34 will be apparent to those skilled in the art from consideration of the specification and practice of the apparatus and method disclosed herein. It is intended that the specification and examples be considered as exemplary only.

What is claimed is:

1. A gear train assembly comprising:
   a first reduction planetary gear set having a rotating carrier and a first reduction planetary gear rotatably coupled to the rotating carrier, the rotating carrier being rotatable about an axis in a primary direction,
   a second reduction planetary gear set having a non-rotating carrier,
   a second reduction planetary gear rotatably coupled to the non-rotating carrier,
   a sheath coupled to the rotating carrier, the sheath having a first sidewall, a second sidewall spaced apart from the first sidewall, and an outer surface positioned between the first sidewall and the second sidewall, the first sidewall being disposed on a first side of the rotating carrier, the second sidewall being disposed on a second side of the rotating carrier, wherein the first reduction planetary gear is partially disposed between the first sidewall and the second sidewall, and
   a vane disposed on the outer surface and positioned from a first end of the outer surface to a second end of the outer surface,
   wherein the vane is nearer the second reduction planetary gear set at the second end than at the first end.

2. The gear train assembly of claim 1, wherein the vane extends generally along a direction that is oblique with respect to the axis.

3. The gear train assembly of claim 1, wherein the first end of the outer surface is located proximal to the rotating carrier and distal to the first reduction planetary gear, and the second end of the outer surface is located proximal to the first reduction planetary gear and distal to the rotating carrier.

4. The gear train assembly of claim 3 wherein the first end of the outer surface is substantially flush with the rotating carrier.

5. The gear train assembly of claim 3 wherein the first end leads the second end as the carrier rotates in the primary direction of rotation.

6. The gear train assembly of claim 1, wherein a cross-section of the outer surface taken along a plane perpendicular to the axis substantially forms an arc.

7. The gear train assembly of claim 6, wherein the first sidewall and the second sidewall are substantially perpendicular to the axis.

8. A sheath for mounting on a carrier of a planetary gear set having a planetary gear, the carrier being rotatable about an axis, the sheath comprising:
   an envelope comprising a first sidewall, a second sidewall spaced apart from the first sidewall, and an outer surface positioned between the first sidewall and the second sidewall, the first sidewall being disposed on a first side of the rotating carrier, the second sidewall being disposed on a second side of the rotating carrier,
   a mounting portion on each of the first sidewall and the second sidewall configured for attachment to the carrier,
   the outer surface having a first end configured to be proximal to the carrier when the sheath is mounted, and a second end configured to be distal to the carrier when the sheath is mounted, and
   a vane disposed on the outer surface and positioned from the first end to the second end,
   wherein the envelope is configured to partially enclose the planetary gear when the sheath is mounted on the carrier such that the planetary gear is partially disposed between the first sidewall and the second sidewall.

9. The sheath of claim 8, wherein the vane extends substantially along a direction oblique to the first sidewall and the second sidewall.

10. The sheath of claim 8, wherein the sheath has a hydrodynamic profile.

11. The sheath of claim 8, wherein the first sidewall and the second sidewall are configured to be substantially perpendicular to the axis when the sheath is mounted on the carrier.

12. The sheath of claim 8, wherein the first end is configured to be substantially flush with the rotating carrier when mounted on the rotating carrier.

* * * * *